(12) United States Patent
De Leeuw

(10) Patent No.: US 9,599,277 B2
(45) Date of Patent: Mar. 21, 2017

(54) FRAME FOR HOLDING AN IRONING BOARD

(71) Applicant: Victorine Gladys De Leeuw-Brouwn, Almere (NL)

(72) Inventor: Albert Louis De Leeuw, Almere (NL)

(73) Assignee: Victorine Gladys De Leeuw-Brouwn, Almere (NL)

( * ) Notice: Subject to any disclaimer, the term of this patent is extended or adjusted under 35 U.S.C. 154(b) by 0 days.

(21) Appl. No.: 14/365,613

(22) PCT Filed: Dec. 17, 2012

(86) PCT No.: PCT/NL2012/050895
§ 371 (c)(1),
(2) Date: Jun. 13, 2014

(87) PCT Pub. No.: WO2013/095126
PCT Pub. Date: Jun. 27, 2013

(65) Prior Publication Data
US 2014/0326851 A1    Nov. 6, 2014

(30) Foreign Application Priority Data

Dec. 16, 2011  (NL) ...................................... 2007992
Jun. 9, 2012  (EP) ...................................... 12171412

(51) Int. Cl.
*F16M 13/00*     (2006.01)
*F16M 11/22*     (2006.01)
(Continued)

(52) U.S. Cl.
CPC ............. *F16M 11/22* (2013.01); *D06F 81/00* (2013.01); *D06F 81/06* (2013.01); *F16M 2200/08* (2013.01)

(58) Field of Classification Search
CPC .......... D06F 81/06; D06F 81/02; D06F 81/00; D06F 81/006; A47B 91/00; A47B 91/06; A47B 91/08; A47B 91/10; A47C 31/002
(Continued)

(56) References Cited

U.S. PATENT DOCUMENTS 2,032,981 A   3/1936  Gallitzin
2,606,380 A   8/1952  Buhr
(Continued)

FOREIGN PATENT DOCUMENTS

CN    87 2 04900    1/1988
CN    2233413    8/1996
(Continued)

OTHER PUBLICATIONS

International Search Report for PCT/NL2012/050895 mailed on May 6, 2013.
(Continued)

*Primary Examiner* — Christopher E Garft
(74) *Attorney, Agent, or Firm* — Ladas & Parry, LLP

(57) ABSTRACT

The invention relates to a frame (1, 100) for holding an ironing board (2) comprising a floor element to be positioned on a floor and a clamping means (7, 8; 107, 108) provided on said floor element for clamping cooperation with support legs of said ironing board (2). A first preferred embodiment is comprised of a frame that comprises a tubular frame (100). A second preferred embodiment is comprised of a frame that comprises a slab (1). Said frame (1, 100) furthermore comprises a guiding system for a chair (3; 106), so as to be able to move to and fro along the ironing board (2).

8 Claims, 11 Drawing Sheets

Figure 1:
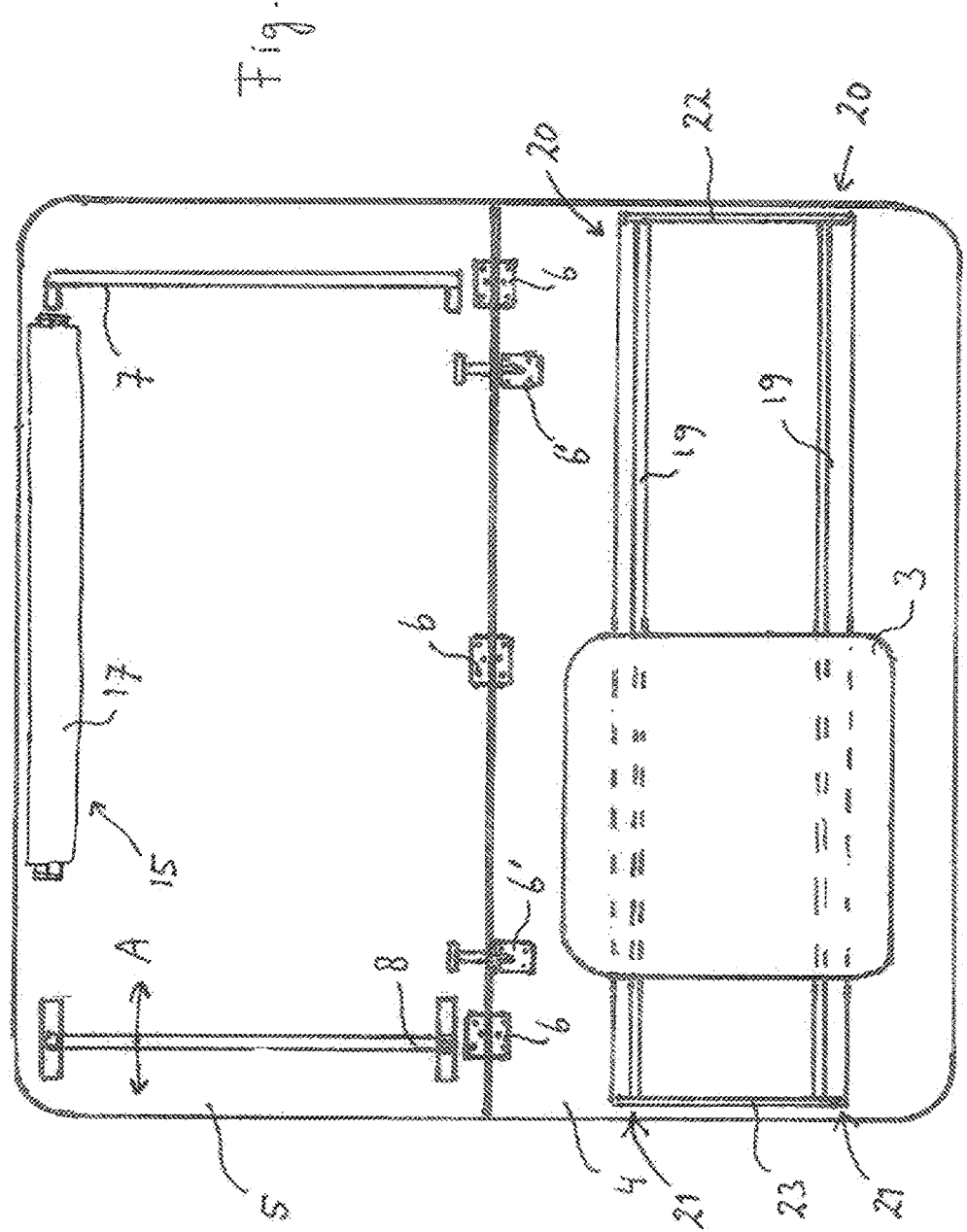

(51) Int. Cl.
*D06F 81/00* (2006.01)
*D06F 81/06* (2006.01)

(58) Field of Classification Search
USPC ............ 297/463.1, 463.2, 310, 217.1, 217.7, 297/174 R, 157.1; 248/188.9, 501, 505, 248/164, 588; 38/104, 108
See application file for complete search history.

(56) References Cited

U.S. PATENT DOCUMENTS

| | | | | | |
|---|---|---|---|---|---|
| 3,475,050 | A | * | 10/1969 | Leahy | A47C 1/143 297/17 |
| 4,720,140 | A | * | 1/1988 | Change, III | A47C 1/14 104/45 |
| 5,513,900 | A | * | 5/1996 | Iglesias | A47C 7/008 248/501 |
| 5,645,258 | A | * | 7/1997 | Flowers | A61G 7/05 248/298.1 |
| 7,568,760 | B1 | * | 8/2009 | Lodes | A47C 7/62 297/172 |
| 8,109,483 | B2 | * | 2/2012 | Cavello et al. | A47B 49/00 248/346.01 |
| 2007/0194191 | A1 | * | 8/2007 | Persson | F16M 13/02 248/225.11 |
| 2014/0203619 | A1 | * | 7/2014 | Dapra | A47C 7/008 297/463.1 |

FOREIGN PATENT DOCUMENTS

| | | |
|---|---|---|
| CN | 1237085 | 12/1999 |
| CN | 101864664 | 10/2010 |
| EP | 1 550 765 A1 | 7/2005 |
| FR | 1 219 914 A | 5/1960 |
| GB | 733 170 A | 7/1955 |
| GB | 970 785 A | 9/1964 |
| GB | 2 306 879 | 5/1997 |
| GB | 2 306 879 A | 5/1997 |
| GB | 2411905 | 9/2005 |
| WO | 2005/040484 | 5/2005 |

OTHER PUBLICATIONS

Office Action dated Nov. 2, 2015 for Chinese Patent Application No. 201280066758.4 and its English translation provided by Applicant's foreign counsel.

Office Action dated May 4, 2016 for Chinese Patent Application No. 201280066758.4 and its English translation provided by Applicant's foreign counsel.

International Preliminary Report on Patentability (Chapter I) for PCT/NL2012/050895 mailed on Jun. 26, 2014.

Written Opinion of the International Searching Authority for PCT/NL2012/050895 mailed on Jun. 5, 2013.

* cited by examiner

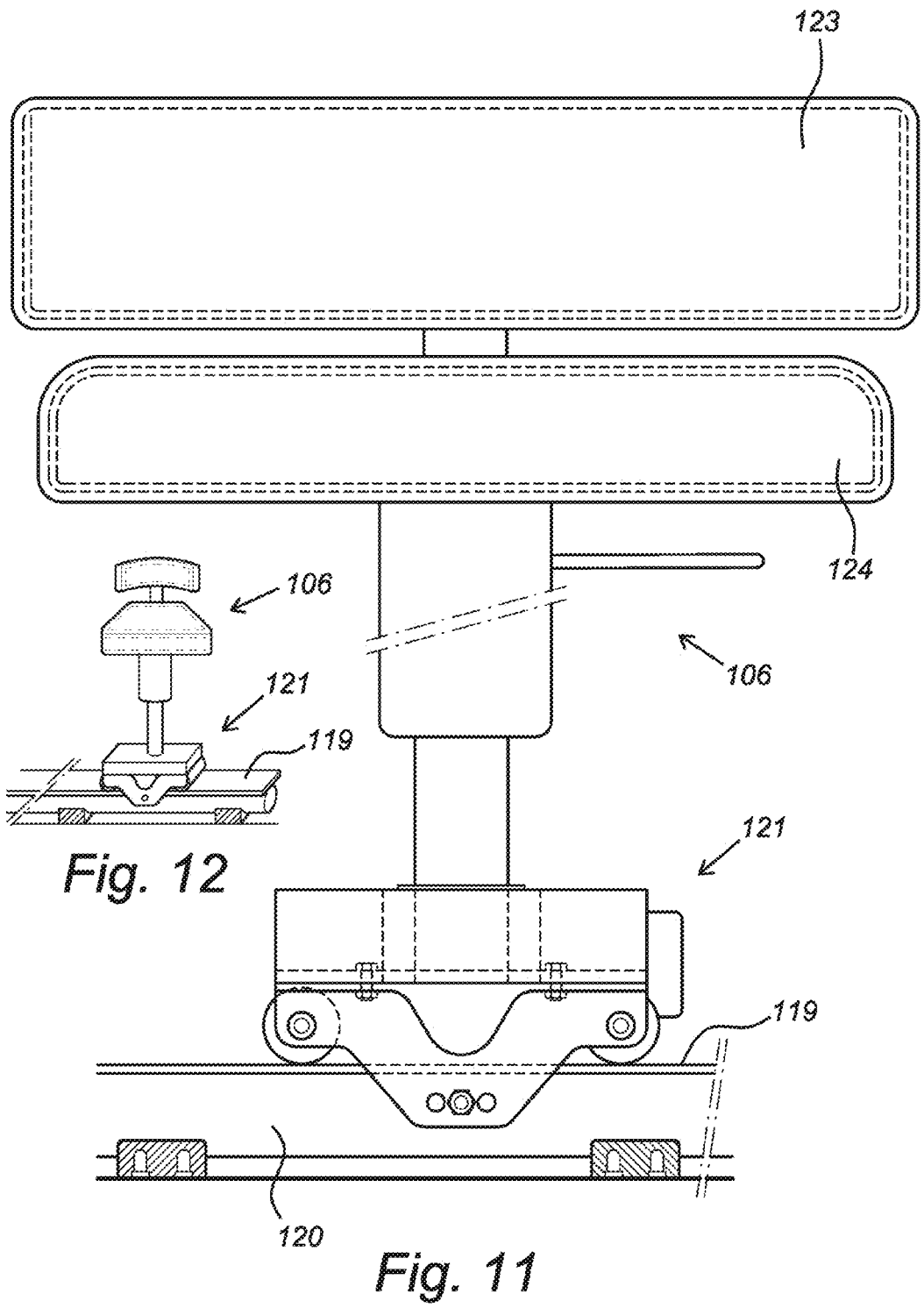

FRAME FOR HOLDING AN IRONING BOARD

CROSS-REFERENCE TO RELATED APPLICATIONS

This application is the U.S. National Stage of International Patent Application No. PCT/NL2012/050895 filed on Dec. 17, 2012, which claims priority to Dutch Patent Application No. 2007992 filed on Dec. 16, 2011 and European Patent Application No. 12171412.5 filed on Jun. 9, 2012, the disclosures of which are hereby incorporated by reference in their entireties.

The present invention relates to a frame for holding an ironing board. Such a frame is novel in the art.

Ironing laundry is a commonly performed art. To this end, an ironing board is positioned on a floor. Because of the height of the ironing surface of the ironing board, the process of ironing has to be performed while standing.

A well-known disadvantage is the instability of ironing boards. To this end, it has already been proposed to widen the legs of the ironing board so as to increase the support surface thereof. However, such is a little used solution, since a person using such ironing board will easily touch the support legs of the ironing board with his feet. As a consequence, the ironing board may easily fall over or the iron may fall off.

It has also shown to be disadvantageous for people having back problems to iron. Such people have to outsource their ironing work or they have to perform the process while sitting. This has as a disadvantage that an instable high chair is required so as to be able to reach the ironing surface.

A further disadvantage consists in the fact that the ironing board may fall over when ironing large pieces of laundry, when said laundry is drawn along the ironing surface.

The invention aims at providing a solution for at least one of the above mentioned disadvantages.

The invention especially aims at providing a solution for at least two of the above mentioned disadvantages.

The invention furthermore aims at providing a solution with which the process of ironing may be performed during a prolonged time.

The invention also aims at providing a solution with which large pieces of laundry may be ironed safely.

So as to obtain at least one of the above mentioned goals, according to a first aspect the invention provides a frame for holding an ironing board, comprising a floor element to be positioned on a floor and a clamping means provided on said floor element for clamping cooperation with support legs of said ironing board. The floor element provides the advantage that the ironing board is positioned much more stable than when positioning the ironing board directly on the floor. The increased surface of the floor element with respect to the surface covered by the support legs of the ironing board provides an enhanced stability. The clamping means may be clamping brackets or retaining clips, in which the support legs of the ironing board are clamped.

It has shown also that the frame according to the invention provides an additionally increased firm surface since the user may take position thereon. Such a synergistic effect is fully novel in the art.

The frame may be implemented in several ways. It is especially preferred that said floor element comprises at least one of:—a tubular frame, and—a slab. A tubular frame provides the advantage that the weight of the frame may be kept low. A frame embodied as a slab has the advantage that a user can easily take position thereon while standing, so as to provide additional stability to the frame.

So as to be able to easily store the frame it is preferred that the floor element is comprised of two linkable separate elements. A frame that carries an ironing board stably, is obtained especially if one of said separate elements comprises clamping means. However, the clamping means may be provided on a plurality of said separate elements.

An easy storage is obtained especially when both separate elements are linkable by means of a hinge. This is an advantage for example in an embodiment where the floor element comprises slabs. The slab is storable in small places, due to the slabs' required small thickness. The slabs may be made from aluminium, as an example.

When comprising a tubular frame, it is preferred that said frame comprises at least two linkable tubes.

The frame preferably comprises tubes, wherein said frame has a circumference and the tubes extend over at least part of said circumference, preferably over at least 75% of said circumference, more preferably over at least 80% of said circumference. The frame commonly and preferably will have a rectangular top view, such that the circumference has four sides. Preferably, the tubes extend over at least a part of at least three sides, more preferably over at least a part of all sides of said circumference. This provides a very high stiffness and rigidity to said frame. As an example, the tubes may extend over a total of three sides, optionally furthermore over a part of the fourth side.

Preferably, the frame has a stiffness, such that the element the ironing board is clamped into, substantially does not bend when an ironing treatment is performed using the ironing board. A slab may be made of aluminium and has a thickness of for example at least 3 mm, preferably at least 4 mm, more preferably at least 5 mm, or may be made of a different material providing a corresponding stiffness. A low weight slab is preferred, in combination with a sufficient stiffness so as to obtain a floor element that will carry an ironing board unflinchingly. A plastic material providing a sufficient stiffness may be suitable for producing a slab. An expert in the art is well capable of choosing a material to produce a frame, both a tubular frame and a slab, which provides an adequate stiffness and rigidity for the intended purpose.

So as to enable disabled people to perform the process of ironing, it is preferred that said frame comprises a guide member for a chair, for guiding said chair along said frame. The chair may be a wheeled chair, like an office chair. To such end, the frame may comprise two parallel elevations between which the wheels of the chair are confined. The elevations may be positioned parallel to a length orientation of an ironing board to be positioned on said frame, such that a user may easily move along the ironing board to and fro. The chair will be confined to a position on said frame, which provides additional rigidity to the frame and the ironing board clamped to said frame. As a consequence, falling over of said ironing board is made impossible, which increases safety.

The invention therefore also relates to a slab, the guiding means having been made by two substantially parallel elevations, for guiding wheels, for example wheels of a chair, there between.

A simple embodiment is comprised such, that the guiding means are comprised of a recess for receiving a wheel of a chair.

An alternative embodiment comprises a U/shaped guiding means for guiding said wheels.

Accordingly, the slab may comprise a trolley to be moved along said slab, and on which a chair can be placed. The trolley may be movable by means of wheels, wherein a guiding system takes care of guiding said wheels, such that the trolley will not leave said slab. The invention therefore also relates to an embodiment wherein the guiding means comprises a recess for receiving wheels of a trolley for a chair. A guiding means as used in skiffs and similar guiding means as used in rowing simulators is suitable for use as guiding means in the present invention.

So as to make the frame suitable for use on a hard surface, for example wood, stone, tiles, artificial materials, it is preferred that said frame comprises a shock absorbing material at a surface to be positioned on said floor. Such a material may serve as protection against damage of the floor. According to a further preferred embodiment, the frame has a rough surface at the side directed towards said floor on which the frame is placed, so as to prevent displacement of the frame there along. The shock absorbing or rough material may be made of a plastic, which may be elastic or not, for example pvc.

Furthermore, it is preferred that one of said separate elements comprises said clamping means and the other of said separate elements comprises guiding means for guiding a chair. Such embodiment provides a frame that can be easily stored and that provides a rigid base for an ironing board.

So as to be able to iron large pieces of laundry, the invention provides a frame as mentioned above, further comprising a guiding rod to be positioned parallel to said frame, for guiding laundry that is to be ironed on an ironing board positioned on said frame. When the user draws the laundry across the ironing board so as to iron a next piece thereof, the power exerted by the user will be transferred to said guiding rod instead of to the ironing board. The guiding rod preferably is borne, more preferably by means of ball bearings, so as to provide an excellent guiding of said laundry.

For being able to apply said guiding means at several heights, the frame preferably comprises a supporting member that is adjustable in height for said guiding rod, for adjusting the distance of said guiding rod to said floor element.

For being able to apply said frame at differently shaped and sized ironing boards, it is preferred that at least one of said clamping means for the support legs of the ironing board is connected at least partly detachably to the frame. This enables a variable positioning of the clamping means on the frame.

It is especially preferred that at least one of said clamping means is connected rotatably, slidably or detachably to the frame, for varying the distance between two clamping means.

A very stable and easily storable frame is obtained when the clamping means and the supporting means for the guiding rod are provided at a first separate element and the guiding means for a chair are provided at a second separate element.

When it is required that the frame is stored small sized, it is preferred that the optional guiding rod is connected pivotally to the supporting means; in such case the supporting rod is connected pivotally, for example by means of hinges, to said frame. The guiding rod then preferably can be moved towards a position along the guiding means, and both elements can be moved towards a position along the frame. This provides a frame that can be stored small sized.

A frame according to the invention has a length of at least 100 cm, preferably at least 120 cm, more preferably at least 150 cm, and a width of at least 50 cm, preferably at least 80 cm, more preferably at least 100 cm, still more preferably at least 120 cm or even at least 150 cm. The term "length" or "length direction" means the direction in which the ironing surface of the ironing board extends, that is the direction in which the chair can be moved to and fro. The term "width" or "width direction" relates to a direction perpendicular to the length direction and to the plane of the floor element.

Anywhere in this description, where there is mention of storing the frame, storing the frame without the ironing board is intended. To that end, the clamping means are moved in a disconnecting position, such that the ironing board can be taken off from the frame.

Figure 2:
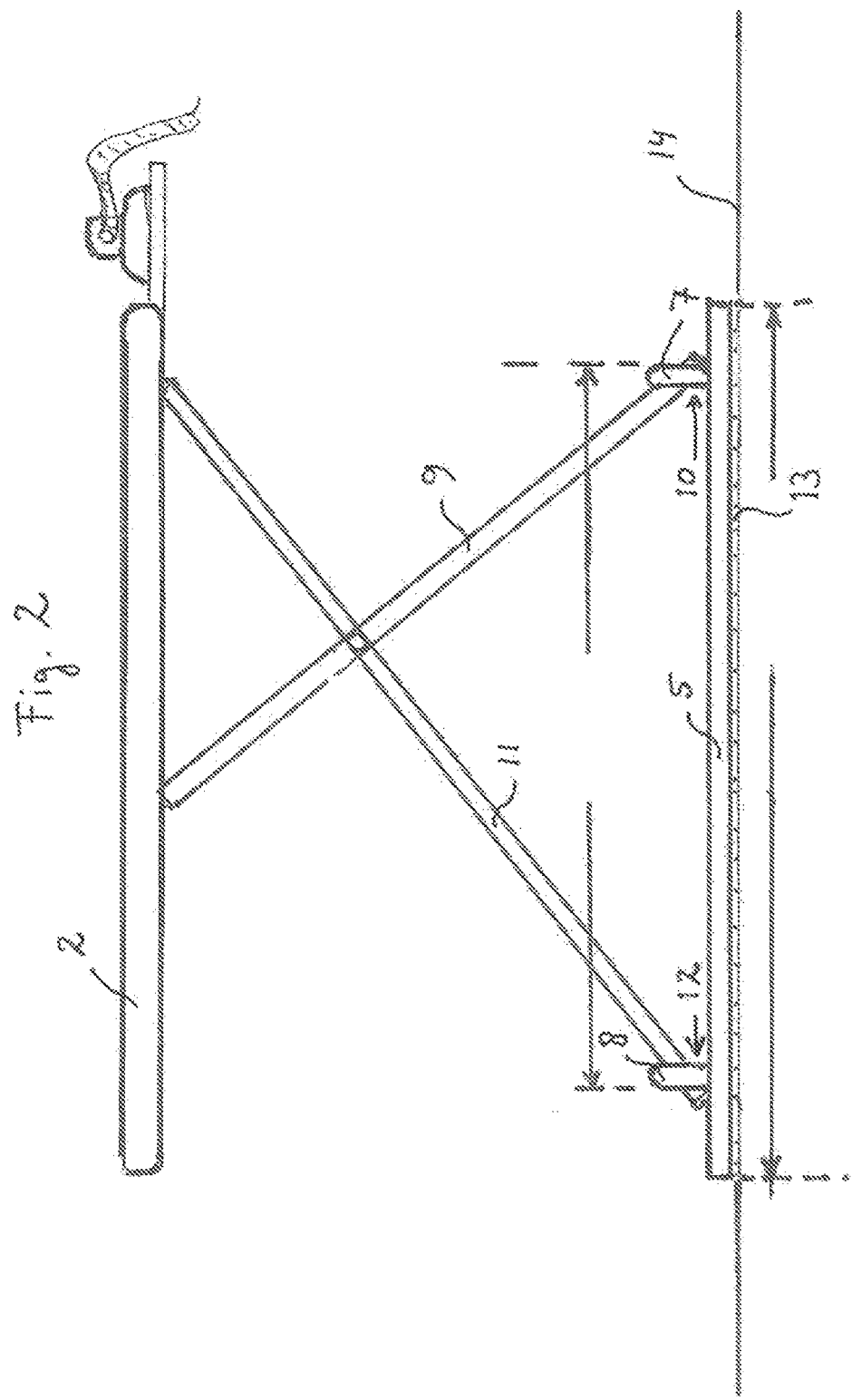
Figure 3:
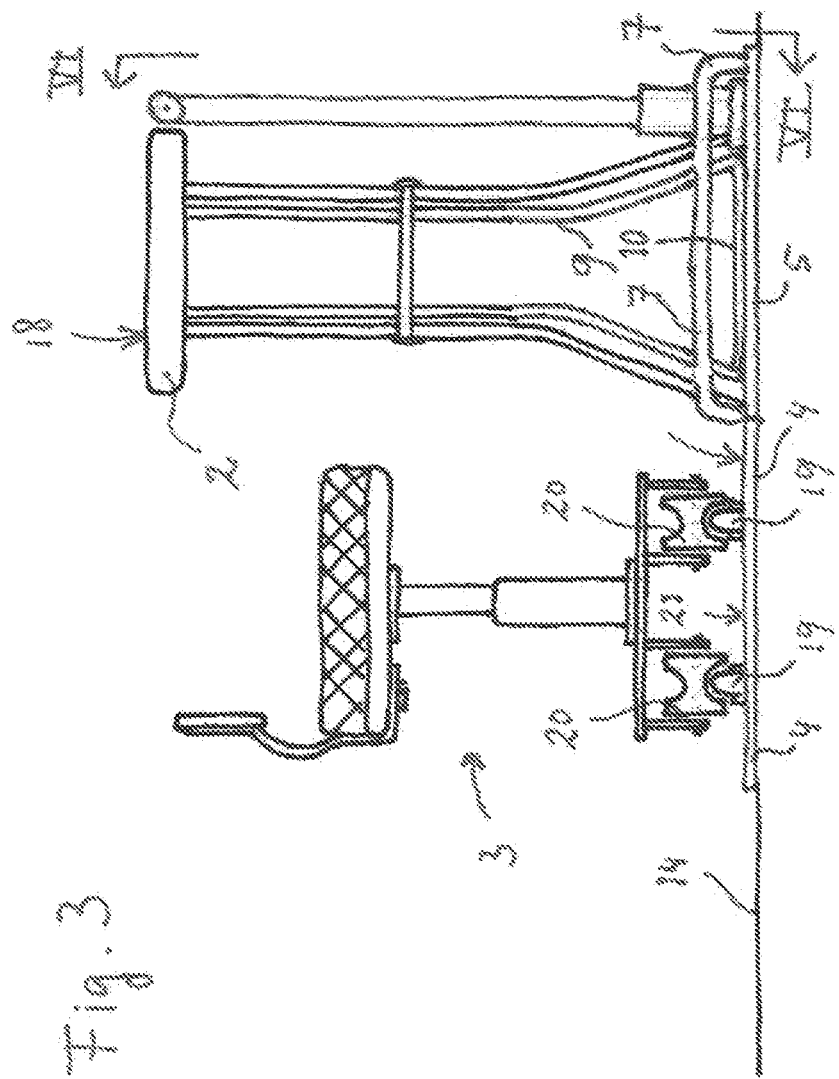
Figure 4:
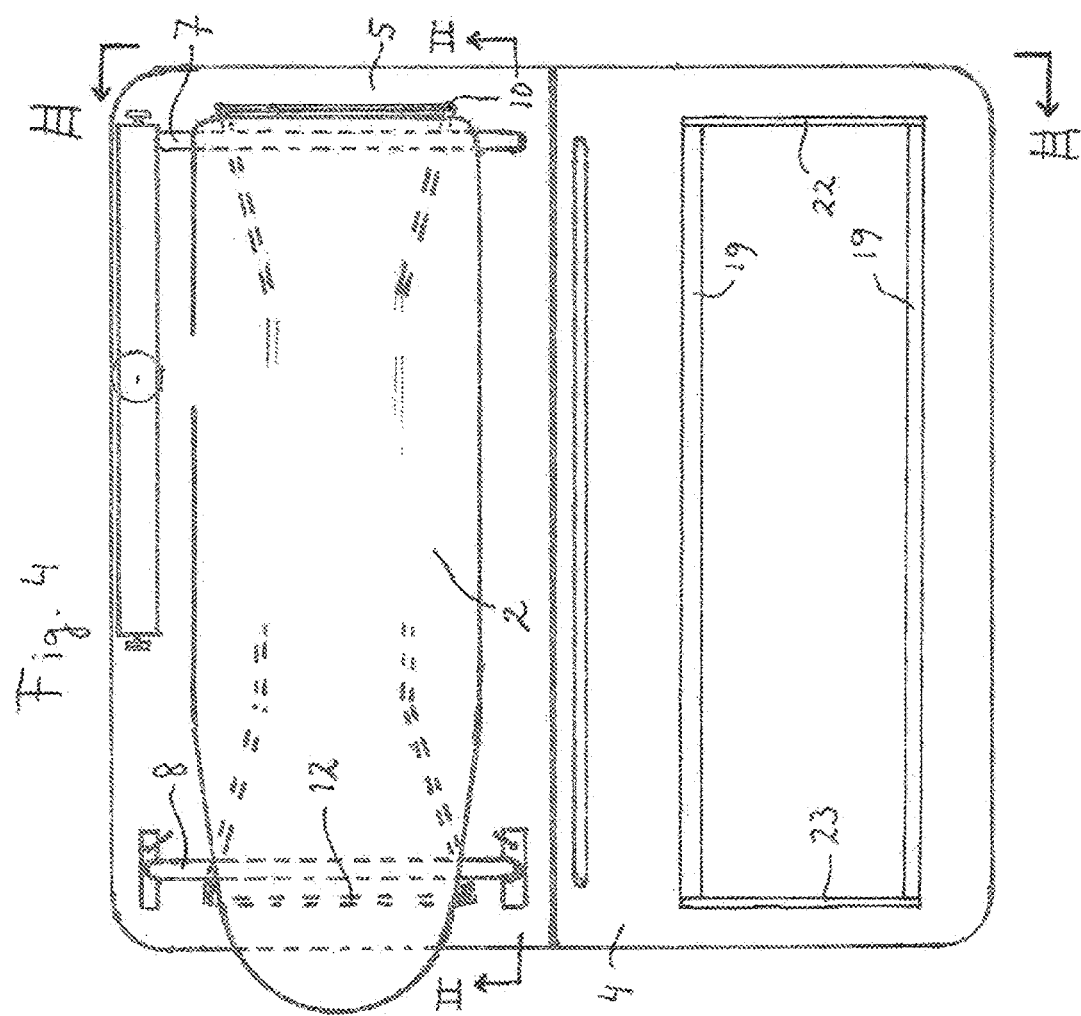
Figure 5:
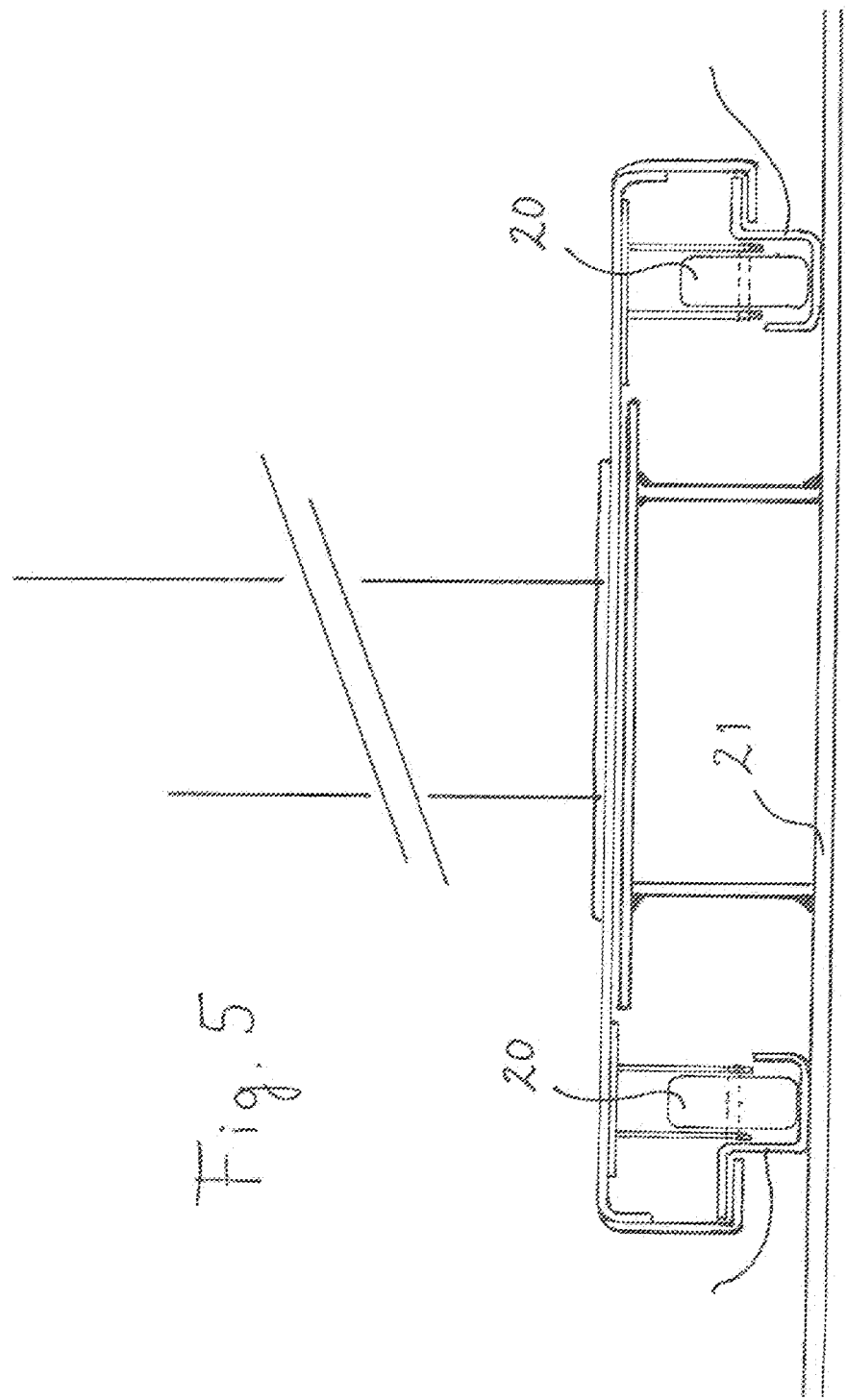
Figure 6:
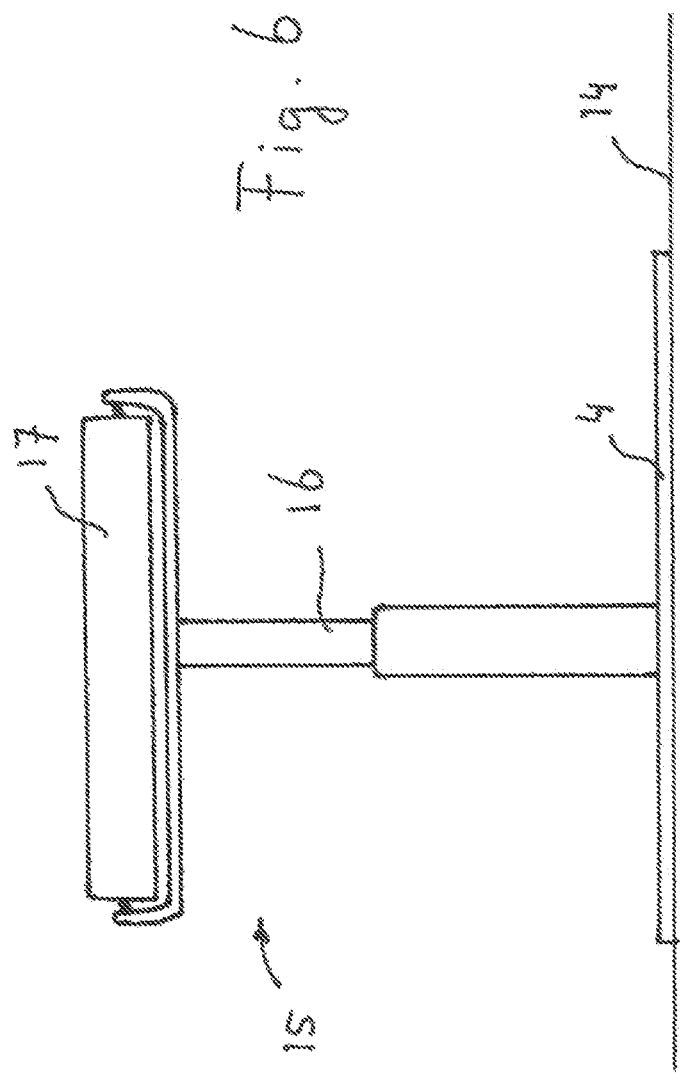
Figure 7:
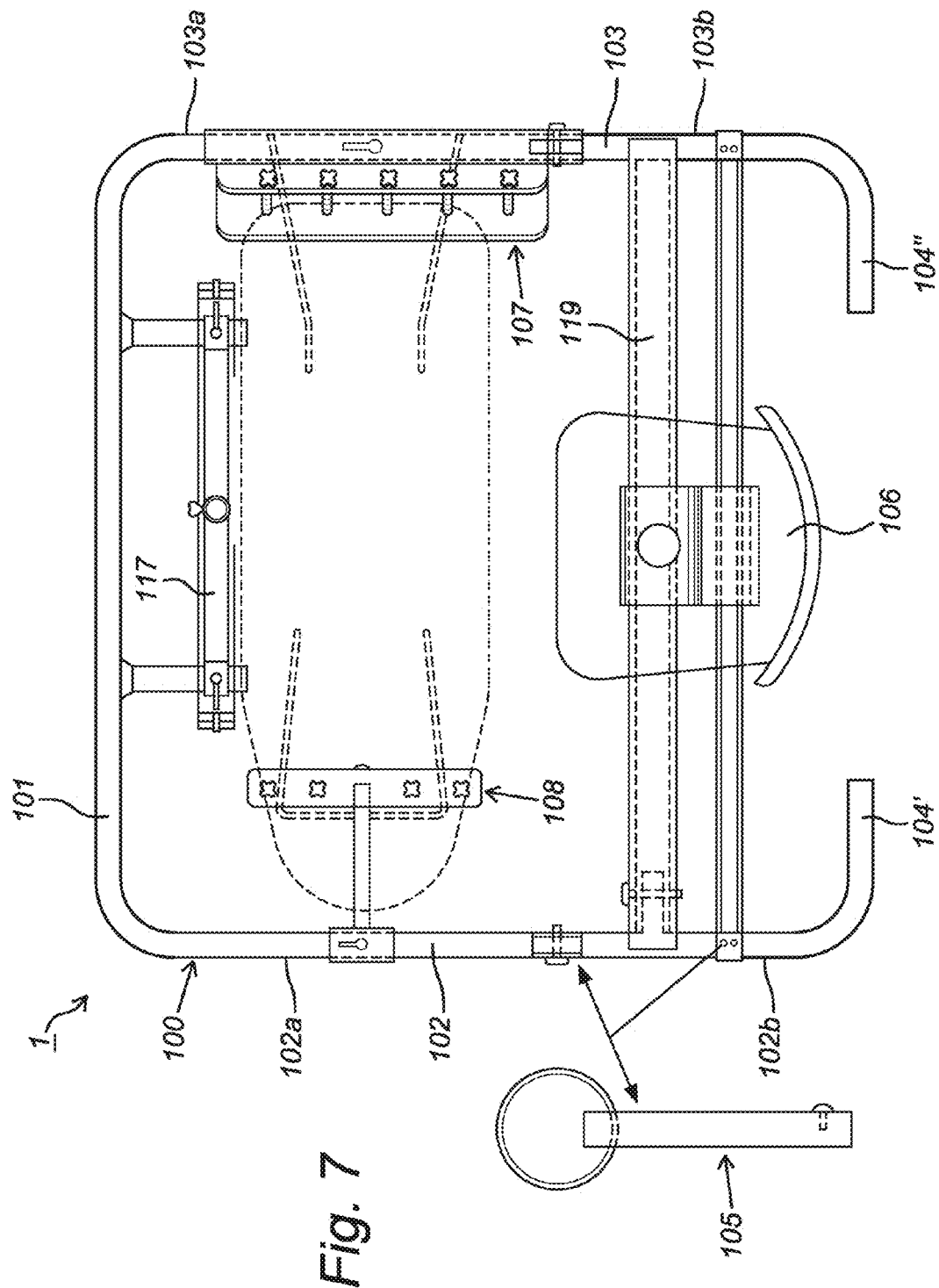
Figure 8:
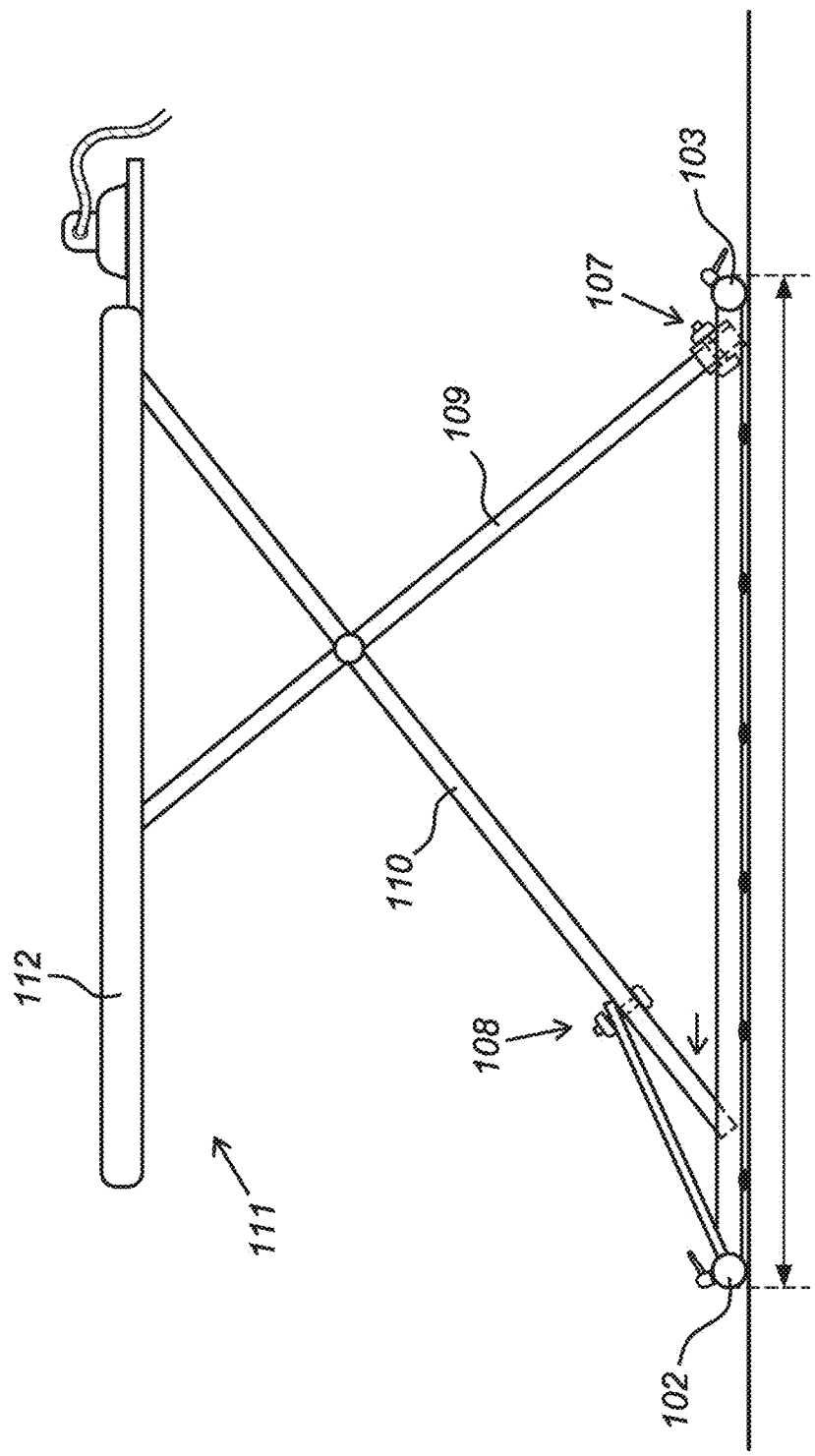
Figure 9:
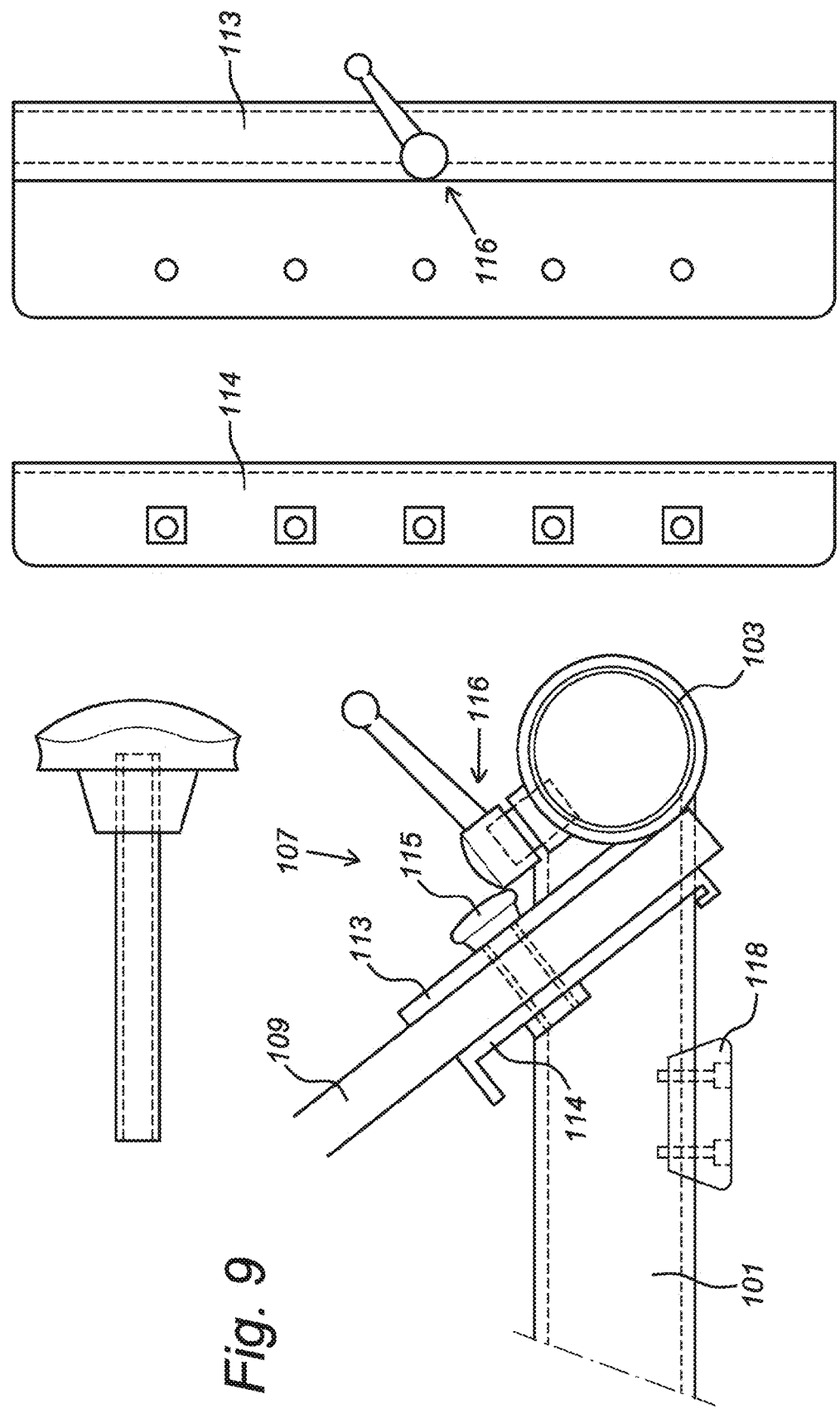
Figure 10:
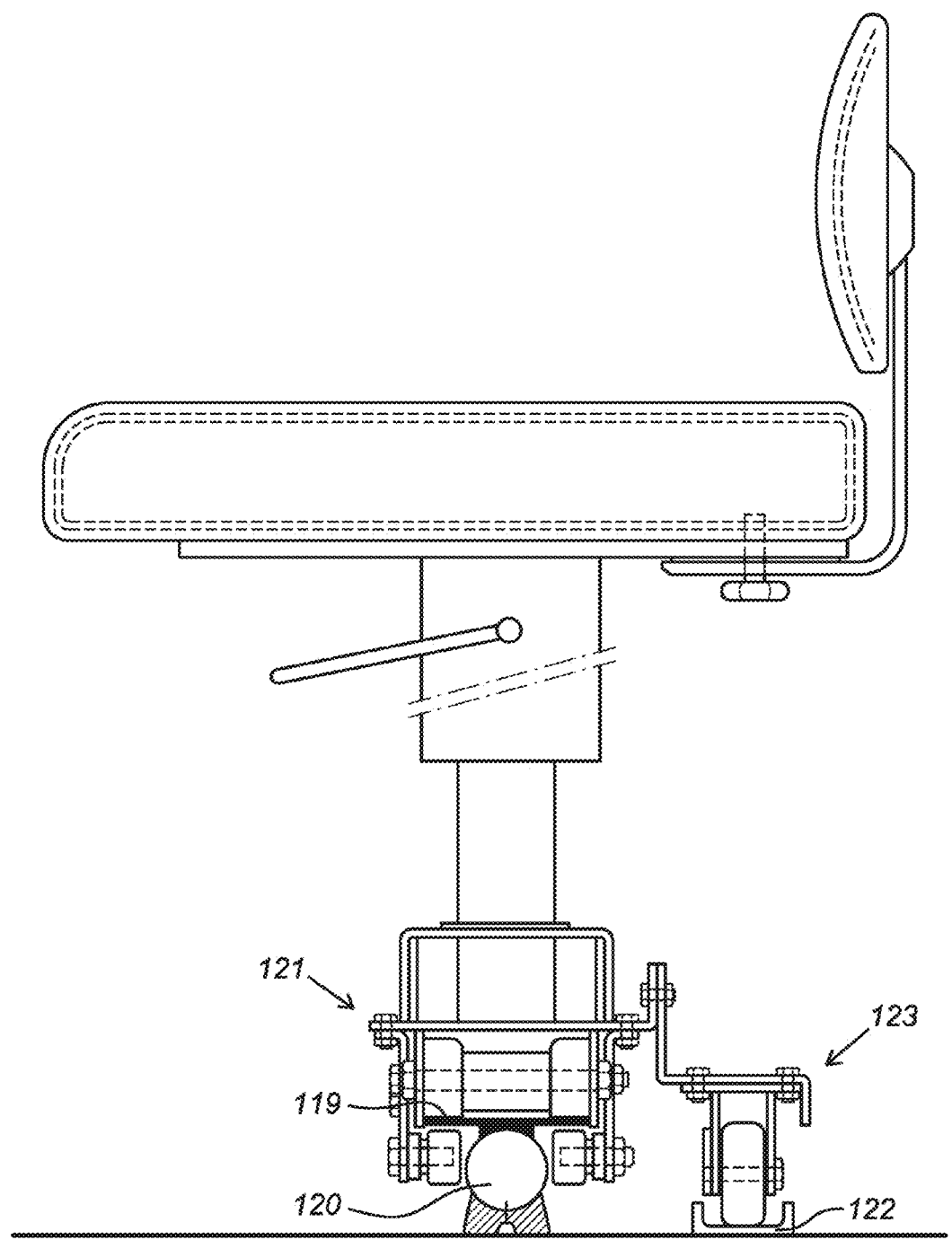

Hereafter, the invention will be described by means of a drawing. The drawing shows in:

FIG. 1 a schematic top view of a frame according to the invention, further showing an ironing board and a chair, FIG. 2 a schematic side view of a frame according to FIG. 1 in the direction of arrows II-II, FIG. 3 a schematic side view of a frame according to FIG. 1 in the direction of arrows III-III, FIG. 4 an alternative embodiment of the frame according to FIG. 1, FIG. 5 a schematic side view of a guiding system for a chair, FIG. 6 a schematic view of the guiding rod for guiding laundry, FIG. 7 an alternative embodiment of the frame according to FIG. 1, FIG. 8 an alternative embodiment of the frame according to FIG. 2, FIG. 9 a detailed view of a clamping means, FIG. 10 an alternative embodiment of a guiding system for a chair, FIG. 11 a side view of the guiding means according to FIG. 10, and FIG. 12 a perspective view of the guiding rod according to FIG. 10 and FIG. 11.

In the figures, the same parts are depicted by means of the same reference numerals. However, not all parts that are required for a practical embodiment have been shown, for ease of understanding the figures.

FIG. 1 shows a schematic top view of a frame 1, embodied as a slab 1. A chair 3 is depicted on top of said slab 1. The slab as shown in FIG. 1 comprises two separate elements 4, 5.

Both separate elements 4, 5 are mutually connected by hinges 6 or connecting or coupling means 6'. Both separate elements 4, 5 are embodied symmetrically. By folding them along hinges 6 optionally by detaching coupling means 6', the surfaces thereof to be positioned on a floor can be placed against each other so as to obtain a compact unit. Hence, storing said slab 1 is very easy.

An ironing board 2 is positioned on said separate element 5, as shown in FIG. 4. A first support leg 9 is positioned in a bracket 7 of said slab 5 with a first end 10. A second support leg 11 is positioned in a bracket 8 of said slab 5 with an end 12. Bracket 8 can be slid—and connected to said slab 5—in a direction to and from the other support leg 7, as indicated by arrow A. As a consequence, the distance between both brackets can be adapted, such that a large number of ironing boards, having different sizes can be connected to the slab.

FIG. 2 shows a schematic side view, along arrows II-II in FIG. 1. This figure clearly shows that the ends 10, 12 of legs 9, 11 are placed into the brackets 7, 8, respectively. Bracket 8 is movable in a direction to and from bracket 7 as identified by arrow A, after which the bracket can be coupled to said slab 5 in a desired position.

FIG. 2 also clearly shows how a bottom side 13 of separate element 5 is positioned on a floor 14.

In FIG. 3 a side view of an alternative embodiment of the frame as shown in FIG. 1 has been shown. Bracket 7 is clearly visible, the end 10 of support leg 9 being positioned there beneath. As a consequence, support leg 9 is clamped between bracket 7 and separate element 5.

FIG. 3 and FIG. 6 furthermore show a schematic view of a laundry guide 15, comprising a support leg 16 and a guide 17, for example embodied as guiding rod or roll bar 17, that is positioned substantially parallel to said ironing surface 18 of said ironing board 2. As a consequence, large pieces of laundry can easily be drawn upwards onto the ironing surface 18.

Preferably, the height of guide 17 is adjustable. Support leg 16 can be embodied telescopically. FIG. 6 shows a schematic view in the direction of arrows VI-VI of FIG. 3.

Then, FIG. 3 shows a chair 3. Chair 3 is movable along rails 19 and comprises wheels 20 which have a shape that cooperates with the shape of rails 19, such that said wheels are guided safely along said rails 19.

As an alternative embodiment, a chair can be provided, the wheels of which are guided in between said rails 19 along surface 21 of said separate element 4, as shown in FIG. 5. Rails 19 can have any desired shape, provided that wheels 20 cannot easily be moved over said rails when moving said chair to and fro along separate element 4.

FIG. 4 shows an alternative embodiment from the one shown in FIG. 1, an ironing board 2 being shown and further comprising a laundry guide 15.

To the ends 20, 21 of rails 19 a stopper 22, 23 has been provided, which prevents that wheels 20 (shown in FIG. 3 and FIG. 5) leave said rails 19. At least one of said stoppers 22, 23 may be detachable, so as to remove said chair, or said trolley for carrying a chair, away from the rails, for example for storing the slab.

FIG. 7 shows an alternative embodiment of frame 1, that is embodied as a tubular frame 100. Tubular frame 100 extends over part of the circumference of frame 1. It comprises tubes 101, 102, 103 and 104', 104". Optionally, tubular parts 104', 104" can be mutually connected, so as to obtain a continuous tubular frame 100. Tube 102 comprises tubular part 102a and a tubular part 102b. Tube 103 comprises tubular part 103a and tubular part 103b, both being mutually connected by means of a pin-hole coupling. Pin 105, especially a security pin, can be positioned into a hole in one of said tubular parts 102a, 102b, or 103a, 103b respectively. Security pin 105 may comprise a retractable ball, as well known in the art.

The present top view also shows a guide slab 122, along which a guiding wheel of said chair 106 may be guided, so as to provide additional guidance. Such is shown in FIG. 10.

Furthermore, FIG. 7 shows a chair 106, a guide rod 117, a guide 119 for moving a chair to and fro and clamping means 107, 108 for positioning legs 109, 110 of an ironing board 111 having an ironing surface 112 (see FIG. 8).

Clamping means 107 is comprised of a few plates that are connected to a tube 103 and which are to be positioned at both sides of leg 109 and are forced towards each other by means of screws or the like. By positioning clamping means 107 pivotally around tube 103, leg 109 can be clamped in a number of different positions. Clamping means 108 is connected pivotally to tube 102 as well, and as a consequence clamping means 108 can be adapted to several positions of leg 110.

FIG. 9 shows a detailed view of clamping means 107. Clamping means 107 comprises a first slab 113 and a second slab 114 which are forced towards each other by means of a bolt 115 and where leg 109 is forcedly held in between said slabs. Said clamping means is connected to said tube 103 rotatably and can be connected thereto by means of a shortcut 116.

FIG. 9 furthermore shows a supporting means 118 at a position below tube 101 for supporting said floor element on a floor.

FIG. 10 shows an alternative embodiment of FIG. 5. A guiding slab 119 is provided on said tube 120. A trolley 121 is guided at both sides of said slab 119 by means of wheels, as shown in FIG. 11, such that a stable and compact guide is obtained. For example, a guide as used in skiffs and in row simulators may be used. A user taking position on seating element 124 of said chair 106, will experience support from back rest 128, especially lumbar support 128.

FIG. 10 also shows an additional guiding wheel 123 which is guided along slab 122 and which provides support to chair 106. When a user rests against lumbar support 128, chair 106 will not tilt.

FIG. 12 shows a perspective view of the wheeled guide of FIG. 10 and FIG. 11.

The invention is not limited to the embodiments as mentioned hereinbefore and as shown in the drawing. The invention is limited to the accompanying claims only.

The invention also relates to all combinations of features that have been discussed separately.

The invention claimed is:

1. An ironing board supporting system, comprising:
   an ironing board;
   a floor element to be positioned on a floor and
   first and second clamping brackets or retaining clips provided on said floor element for clamping cooperation with first and second support legs of said ironing board, the first clamping bracket or retaining clip clamping the first support leg of the ironing board and the second clamping bracket or retaining clip clamping the second support leg of the ironing board, wherein at least one of the first and second clamping brackets or retaining clips is connected slidably to the frame and configured to vary a distance between the first and second clamping brackets or retaining clips; and
   a guiding rail guiding a chair along the frame and slidably connectable with the chair so that the chair is movable along the frame.

2. The ironing board supporting system according to claim 1, wherein said frame comprises a shock absorbing material at a surface to be positioned on said floor.

3. The ironing board supporting system according to claim 1, comprising a guiding rod to be positioned parallel to said frame, for guiding laundry that is to be ironed on the ironing board positioned on said frame.

4. The ironing board supporting system according to claim 3, comprising a supporting member that is adjustable in height for said guiding rod, for adjusting the distance of said guiding rod to said floor element.

5. The ironing board supporting system according to claim 1, wherein the frame has a length of at least 100 cm, preferably at least 120 cm, more preferably at least 150 cm, and a width of at least 50 cm, preferably at least 80 cm, more preferably at least 100 cm, still more preferably at least 120 cm or even at least 150 cm.

6. The ironing board supporting system of claim 1, wherein the floor element comprises two linkable separate elements, one of the separate elements of the floor element comprising the first and second clamping brackets or retaining clips, the frame further comprises a hinge connecting one of the separate elements of the floor element and an other of the separate elements of the floor element.

7. The ironing board supporting system of claim 6, wherein the other of the separate elements of the floor element comprises the guiding rail.

8. The ironing board supporting system of claim 1, further comprising a stopper at an end of the guiding rail.

\* \* \* \* \*